US006470240B1

(12) United States Patent
Haynes et al.

(10) Patent No.: US 6,470,240 B1
(45) Date of Patent: Oct. 22, 2002

(54) SYSTEM FOR MONITORING OPERATOR PERFORMANCE

(75) Inventors: Ian Frederick Haynes, Norman Park; Robert Walter Lockhart Gibson, Chelmer, both of (AU)

(73) Assignee: Vigil Systems Pty Ltd, Queensland (AU)

( * ) Notice: Subject to any disclaimer, the term of this patent is extended or adjusted under 35 U.S.C. 154(b) by 0 days.

(21) Appl. No.: 09/706,826

(22) Filed: Nov. 7, 2000

(51) Int. Cl.[7] .................................................. G05D 1/00
(52) U.S. Cl. ................................ 701/1; 701/36; 701/35
(58) Field of Search ................................ 701/1, 35, 36, 701/58, 59

(56) References Cited

U.S. PATENT DOCUMENTS

| | | | | | |
|---|---|---|---|---|---|
| 6,029,102 | A | * | 2/2000 | Elsman | 701/1 |
| 6,253,129 | B1 | * | 6/2001 | Jenkins et al. | 701/29 |
| 6,266,588 | B1 | * | 7/2001 | McClellan et al. | 701/35 |
| 6,269,292 | B1 | * | 7/2001 | Kokuba et al. | 701/35 |
| 6,292,719 | B1 | * | 9/2001 | Seto et al. | 701/1 |

* cited by examiner

*Primary Examiner*—Richard M. Camby
(74) *Attorney, Agent, or Firm*—Young & Thompson

(57) ABSTRACT

A system (50) for monitoring and/or evaluating performance of an operator of a controllably movable object is provided. The object has operational parameters including turning, accelerating and braking operations, and at least one of the operational parameters changes with behaviours of the operator. The system (10 or 50) comprises a housing member (52) with a chamber therein and a sensing unit (64) positioned on said housing member (52) or in said chamber. The sensing unit (52) is a multi-axial moving coil accelerometer and each axis being arranged to sense one of said operational parameters. The system (50) also has a processing unit including a data acquisition sub-system (70) and an event decision subsystem (68) coupled to receive signals representative of the operational parameters from said sensing unit (52) to process the received signals and to provide output signals corresponding to the performance relating to one or more aspects of the operating behaviours of said operator; and an indication unit including an audio indication (72) and a visual indication (74) arranged to receive the output signals and to thereby provide an indication of the operator performance.

21 Claims, 9 Drawing Sheets

| | | acceleration | | direction | sum acce | pie accel | velocity | |
|---|---|---|---|---|---|---|---|---|
| ne => 14:03:22 14:03:22 | 3.52 | 0.07 | 2.66 | 0 | 0.07 | 0.2 | 0.00 | -7.72047000 |
| ne => 14:03:22 14:03:22 | 3.51 | 0.05 | 2.65 | 0.00 | 0.05 | 0.1 | 0.05 | 36.14004000 |
| ne => 14:03:22 14:03:22 | 3.49 | 0.04 | 2.64 | 0.00 | 0.04 | 0.1 | 0.09 | |
| ne => 14:03:23 14:03:23 | 3.49 | 0.03 | 2.64 | -0.01 | 0.03 | 0.1 | 0.12 | |
| ne => 14:03:23 14:03:23 | 3.48 | 0.02 | 2.64 | -0.02 | 0.03 | 0.1 | 0.14 | |
| ne => 14:03:23 14:03:23 | 3.48 | 0.02 | 2.64 | -0.02 | 0.03 | 0.1 | 0.16 | |
| ne => 14:03:23 14:03:23 | 3.49 | 0.02 | 2.64 | -0.02 | 0.03 | 0.1 | 0.18 | |
| ne => 14:03:23 14:03:23 | 3.49 | 0.02 | 2.65 | -0.01 | 0.02 | 0.1 | 0.20 | |
| ne => 14:03:24 14:03:24 | 3.49 | 0.03 | 2.65 | -0.01 | 0.03 | 0.1 | 0.23 | |
| ne => 14:03:24 14:03:24 | 3.49 | 0.03 | 2.65 | -0.01 | 0.03 | 0.1 | 0.26 | |
| me => 14:03:24 14:03:24 | 3.49 | 0.03 | 2.68 | 0.00 | 0.03 | 0.1 | 0.28 | |
| me => 14:03:24 14:03:24 | 3.48 | 0.02 | 2.66 | 0.00 | 0.02 | 0.1 | 0.30 | |
| me => 14:03:25 14:03:25 | 3.49 | 0.02 | 2.67 | 0.00 | 0.02 | 0.1 | 0.32 | |
| me => 14:03:25 14:03:25 | 3.47 | 0.02 | 2.66 | 0.00 | 0.02 | 0.1 | 0.34 | |
| me => 14:03:25 14:03:25 | 3.47 | 0.01 | 2.66 | 0.00 | 0.01 | 0.1 | 0.35 | |
| me => 14:03:25 14:03:25 | 3.47 | 0.01 | 2.67 | 0.00 | 0.01 | 0.1 | 0.36 | |
| me => 14:03:25 14:03:25 | 3.48 | 0.01 | 2.68 | 0.00 | 0.01 | 0.1 | 0.37 | |
| me => 14:03:26 14:03:26 | 3.47 | 0.01 | 2.68 | 0.01 | 0.01 | 0.1 | 0.38 | |
| me => 14:03:26 14:03:26 | 3.48 | 0.01 | 2.67 | 0.01 | 0.01 | 0.1 | 0.39 | |
| me => 14:03:26 14:03:26 | 3.48 | 0.01 | 2.65 | 0.00 | 0.01 | 0.1 | 0.40 | |
| ime => 14:03:26 14:03:26 | 3.47 | 0.01 | 2.67 | 0.00 | 0.01 | 0.1 | 0.41 | |
| ime => 14:03:27 14:03:27 | 3.48 | 0.01 | 2.65 | 0.00 | 0.01 | 0.1 | 0.42 | |
| ime => 14:03:27 14:03:27 | 3.48 | 0.01 | 2.67 | 0.00 | 0.01 | 0.1 | 0.43 | |
| ime => 14:03:27 14:03:27 | 3.47 | 0.01 | 2.65 | 0.00 | 0.01 | 0.1 | 0.44 | |
| ime => 14:03:27 14:03:27 | 3.47 | 0.01 | 2.63 | -0.01 | 0.01 | 0.1 | 0.45 | |
| ime => 14:03:27 14:03:27 | 3.47 | 0.01 | 2.66 | -0.01 | 0.01 | 0.1 | 0.46 | |
| ime => 14:03:28 14:03:28 | 3.46 | 0.00 | 2.65 | -0.01 | 0.01 | 0.1 | 0.46 | |
| ime => 14:03:28 14:03:28 | 3.46 | 0.00 | 2.65 | 0.00 | 0.00 | 0 | 0.46 | |
| ime => 14:03:28 14:03:28 | 3.46 | 0.00 | 2.65 | -0.01 | 0.01 | 0.1 | 0.46 | |
| ime => 14:03:28 14:03:28 | 3.46 | 0.00 | 2.65 | -0.01 | 0.01 | 0.1 | 0.46 | |
| ime => 14:03:29 14:03:29 | 3.46 | 0.00 | 2.65 | -0.01 | 0.01 | 0.1 | 0.46 | |
| ime => 14:03:29 14:03:29 | 3.45 | 0.00 | 2.65 | -0.01 | 0.01 | 0.1 | 0.46 | |
| ime => 14:03:29 14:03:29 | 3.46 | 0.00 | 2.65 | -0.01 | 0.01 | 0.1 | 0.46 | |
| ime => 14:03:29 14:03:29 | 3.45 | 0.00 | 2.67 | 0.00 | 0.00 | 0 | 0.46 | |
| ime => 14:03:29 14:03:29 | 3.45 | 0.00 | 2.65 | 0.00 | 0.00 | 0 | 0.46 | |

accel 0g = 3.45 v
1g accel = 4.46 v
1g braking = 2.39v turning 0g = 2.52v
left turn 1 g=3.74v
right turn 1 g=1.46v

FIG. 6A

SYSTEM FOR MONITORING OPERATOR PERFORMANCE

TECHNICAL FIELD OF THE INVENTION

THIS INVENTION relates to a system for monitoring and/or evaluating performance of an operator of a controllably movable object and in particular but not limited to a system for monitoring and/or evaluating performance of a driver of a vehicle and providing an indication of performance relating to one or more aspects of driving behaviours.

BACKGROUND OF THE INVENTION

Organisations such as businesses and Government authorities own or operate large numbers of machines and equipment which have at least one movable component. The movable components can usually be controlled by operators.

Most families, individuals and groups of individuals also own or operate some machines and equipment with controllable movable components.

Examples of the machines and equipment are vehicles such as cars, motor bikes, trucks, tractors, different types of earth working vehicles, air crafts, boats, cranes, overhead cranes, drag lines, conveying lines in process plants, shaping and cutting equipment in workshops and electrically or fuel powered tools.

It is known that the usual life expectancy, operating costs, resale value and the frequencies of maintenance of these machines and equipment correspond directly to operator behaviours.

It is also known that the these machines and equipment often cause accidents which may lead to injuries to operators or people, and damages to the machines, equipment and properties nearby, as well as damages to themselves, when they are not operated in accordance with appropriate guidelines or appropriate standards.

Therefore there is a need for a system which can provide a measurable performance and/or a feed back of an operator when operating one of such machines and equipment. Examples of the feed back can be an audio indication such as a buzzer, a visual indication such as light, or any other indication.

Businesses such as fleet owners and insurance companies will be able to monitor operating performances of different operators and to offer incentives to operators with good operating performances.

Government authorities and family members will also be able to use the system for encouraging and reinforcing improved operator performance.

Such a system will also indicate aspects of operating behaviours which require attention. Teaching and tutoring programs for correcting operating behaviours can therefore be objective.

The applicant is aware of certain prior attempts to provide systems for monitoring operational parameters of vehicles. These prior art systems require sensors for measuring the desired operational parameters such as speed, engine RPM, brake application, etc., to be positioned at or close to vehicle components from which measurements of the parameters are taken. U.S. Pat. No. 5,546,305 to Kondo is an example of such attempts.

The prior art systems are intended for use in a single vehicle and can not be readily removed for use in another vehicle once they are installed. Skilled automotive technicians are usually required to install these systems as their sensors are to be fixedly mounted to said components or parts of the vehicles that are close to said components. Automotive technicians are also required to attend to the removal of the installed system as the vehicle parts must be removed before removing the sensors.

The prior art systems may also interfere with the complex electronic systems of modern vehicles as they may be directly connected to the electronic systems.

These systems also need to be recalibrated when reinstalling in the same or different vehicles.

The prior art systems are limited in their ability to monitor lane changing or turning of a vehicle. These systems therefore can not be used to evaluate a full range of driver behaviours.

Power consumption of the prior art systems is relatively high and unregulated. Batteries for these systems must be of large capacity and therefore bulky, or be replaced at a relatively short time of use. Alternatively the systems must draw on the vehicle's power supply.

Hereinafter, these vehicles, machines and equipment are referred to as "controllably movable objects".

OBJECT OF THE INVENTION

An object of the present invention is to alleviate or to reduce to a certain level one or more of the prior art disadvantages.

OUTLINE OF THE INVENTION

In one aspect therefore the present invention resides in a system for monitoring and/or evaluating performance of an operator of a controllably movable object having operational parameters and at least one of the operational parameters change with behaviours of the operator. The system comprises a housing member with a chamber therein, a sensing unit positioned on said housing member or in said chamber, the sensing unit having one or more sensors, each sensor being arranged to sense one of said operational parameters; a processing unit coupled to receive signals representative of the operational parameters from said one or more sensors, to process the received signals and to provide output signals corresponding to the performance relating to one or more aspects of the operating behaviours of said operator; and an indication unit arranged to receive the output signals and to thereby provide an indication of the operator performance.

In another aspect therefore the present invention resides in a system for monitoring and/or evaluating performance of an operator of a controllably movable object having operational parameters and at least one of the operational parameters is changeable when varying an aspect of operating behaviours of the operator. The system comprises a sensing unit having one or more sensors, each sensor being arranged to sense at least one of said operational parameters including a parameter for turning of said object to a different direction and/or movement of the object along a curved trajectory; a processing unit arranged to receive signals representative of the operational parameters from said one or more sensors, lo process the received signals and to provide output signals corresponding to the performance relating to one or more aspects of the operating behaviours of said operator. The system is characterised in that said one aspect or at least one of said aspects being turning said object to a different direction. An indication unit is arranged to receive the output signals and to thereby provide an indication of the operator performance.

The controllably movable object may be a vehicle, an overhead crane, a drag line, a power tool or the like.

The sensors may be of the type or types selected from one or more of the followings:

1–6 axis accelerometers;

1–3 axis gyroscopes micro-switches;

inclination switches;

proximity switches and other position sensing devices;

current sensing transducers/voltage sensing transducers;

ultrasonic transducers;

infra red transducers;

radar transducers or other radio frequency devices;

microphones;

rain and moisture detectors;

temperature sensors;

humidity sensors;

pressure sensors;

liquid level sensors;

biological (perspectium)/physiological (Eg Eyes, hands etc)

potentiometers;

cameras;

video;

global positioning system;

radio direction finding system;

interfaces to object control system Eg engine and vehicle management systems; and interfaces to object or vehicle guidance and navigation systems The sensed operational parameters may include any one or a combination of two or more of the followings:

accelerations and decelerations;

orientation in multiple axes;

braking and retarding devices;

cornering;

lane changes;

smoothness of operating;

gear changes;

warning lights;

sound levels;

road quality;

weather conditions;

proximity to other objects;

speed;

position;

engine, motor or transmission operation characteristic; and suspension characteristic.

In preference said one or more sensors are a plurality of single axial accelerometers or gyroscopes, or each said one or more sensors is a multi axial accelerometer or gyroscope.

It is preferred that said system includes filtering means for filtering signal noise components in the signals from the sensor(s). The filtering means may have one or more physical filters for filtering noise components from mechanical vibrations emanating from the movable object. Resilient mounting pads and vibration attenuator are examples of the physical filters.

The filtering means may also have one or more electrical noise filters for filtering electrical noise components. Examples of the electrical noise filters are passive filters, active filters and micro-processor or digital signal processor based signal processing filtering techniques.

Advantageously, the system includes calibration means for adjustably calibrating the system to suit the characteristics of operation, characteristics of moveable object and application of movable object and/or type of movable object. More advantageously the calibration means can also be calibrated to account for location, position, weather conditions, etc. Typically, for motor vehicles the calibration means can be used to calibrate preferred acceleration and braking thresholds for a particular model, or other operational preferences.

The calibration means is a self-contained or plug-in sub-system that allows persons wishing to use the system to:

Adjust for sensor variation across individual sensors;

Include quickly, new sensor types into the system;

Rapidly adjust the system for different controllably movable object types;

Set benchmarks for particular customer/operator requirements.

The calibration means operates at the logical rather than electrical level as all sensors will be given appropriate ancillary circuitry as required so as not to exceed safe operating characteristics of the invention.

The calibration means includes separate or integrated data acquisition and event recording capability that allows thresholds to be set by either operating the controllably movable object and recording when thresholds of performance have been reached as exceeded or by downloading thresholds from predetermined benchmarks (eg 10% better than the norm) or historical operation (eg 10% better than last week). Those thresholds may be stored in the recording means or analysing means to facilitate indication of undesirable operation during or after investigation periods.

The calibration means may have a physical or variable capacitance, resistance and/or inductance for adjusting the desirable, characteristics of operation. Alternatively the adjustment can be made by digitally adjusting calibration signals to the processing unit.

Conveniently the calibration can be adjusted by replacing a plug calibration module or by adjusting remotely via a communication link.

The signal processing unit typically includes signal recording means, user data input means and signal analysing means. It may also include an analogue to digital conversion means where the signals from the sensor(s) are analogue.

The signal recording means desirably includes a signal storage for storing the operational parameter signals or data from the sensor(s). The signals or data may be processed or raw. The signal storage can be non volatile memory, battery backed up memory, a disk drive, read and writable CD ROM, a tape drive, physical, magnetic or optical storage device, electrical, chemical, biological or the like.

Typically, the recording means has a continuous or discrete recording device or an event counter which can be a single or multiple event type. Preferably a real time clock is included so that the output from the recording device or the event counter is provided with time stamps. It may also include a data acquisition device coupled to the sensing unit. The data acquisition device may be a multiplexed system on communication bus or a PCMCIA card based acquisition system.

The recording means may be controlled remotely via a radio communication system, satellite, telephone, computer network or the like.

The user data input means is in the form of switches, touch screen, touch pad, key pad, ID card reader, biometric system, voice and the like for allowing entry of data such as operator identity, type of object, object characteristics, object application sensor type and location.

It is preferred that the system of the invention has an authorisation confirming arrangement so that only authorised persons can enter certain data or edit data.

The signal analysing means on command can retrieve signals from the signal recording means, process the retrieved signals with respect to the calibration means and provide out signals to the indication means for indicating processed performance of the operator.

Typically the performance is indicated in the form of performance level against time periods of operation, distance, location and application.

The form of indication may be physical graphical, alpha numeric, visual or audible.

The performance indication may. show performances of two or more operators over the same time periods so that the performances of the operators can be easily measured and evaluated.

The performance indication may also show selected aspects of the operator's performance so that the aspects that require attention can be easily identified. Typically said aspects include acceleration, brake application, direction line, changing gear changes, proximity behind another vehicle, etc.

Typically the signal analysing system employs signal processing techniques such as Fourier transform, neural networks, artificial intelligence, pattern matching, spread sheet program, Data base and means, spectral analysis, and statistical and scenario modelling to derive the thresholds and displays for the performance indications.

The derivation may include comparing multiple signals, determining rates of change, determining correlation with pre-defined positive and negative patterns of operation and comparison of scores with distance travelled, time of operation or other criteria.

In a further aspect therefore the present invention resides in a power management arrangement for a system for monitoring and/or evaluating performance of an operator of a controllably movable object having operational parameters and at least one of the operational parameters is changeable when varying an aspect of operating behaviours of the operator. The arrangement comprises one or more movement detectors for providing an output signal when detecting movement of said object, a timing circuitry for timing a first predetermined time period following detection of output signal by said one or more movement detectors and a power control circuitry for controllably reducing power consumption when no output signal is detected following expiration of said first predetermined time period.

The power management arrangement may include linked microprocessors or digital signal processors providing a low power standby mode without compromising system performance.

The power management arrangement assists in allowing the system according to this invention to be relatively small in size and portable. It also allows the system to extend its periods of deployment.

BRIEF DESCRIPTION OF THE DRAWINGS

In order that the present invention can be readily understood and put into practical effect reference will now made with the accompanying drawing which illustrate non limiting embodiments of the present invention and wherein:

FIGS. 2 to 6A are examples of the performance indications provided by the system shown in FIGS. 1 and 1A;

DETAILED DESCRIPTION OF THE DRAWINGS

Figure 1:
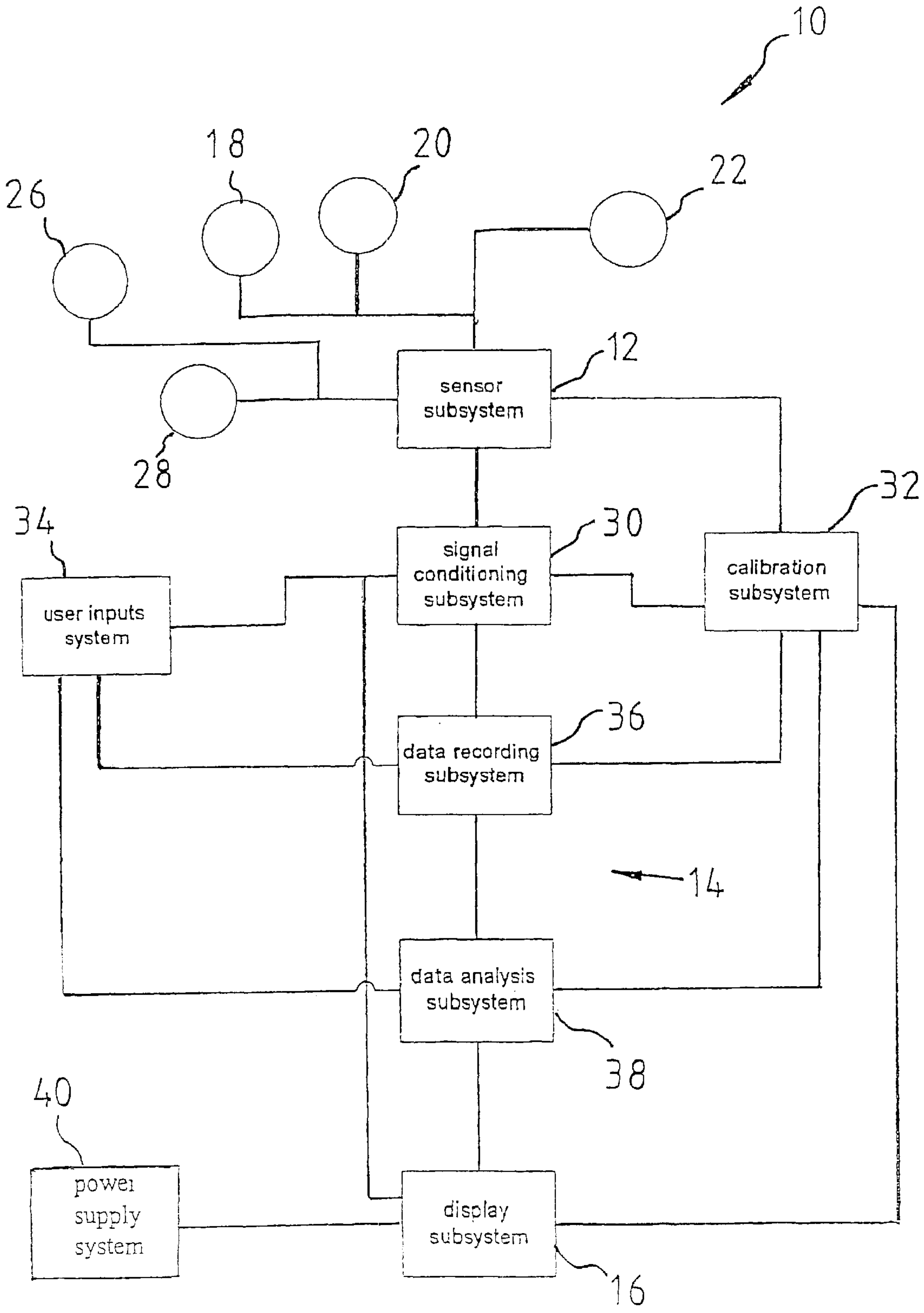
FIG. 1 is a flow diagram showing various units of an embodiment of the system according to the present invention.

Referring initially to FIG. 1 there is shown a system 10 for monitoring and/or evaluating driver performances when driving a vehicle. The system 10 comprises a sensing unit 12 coupled to a signal processing unit 14 for processing the signals from the sensing unit 12. The sensors in this case are 1–6 axial accelerometers 18, 19 and 20 for respectively sensing acceleration operation, deceleration operation and turning of the vehicle. The accelerometers 18, 19 and 20 for this embodiment is a generic + or −10 g accelerometers and they are positioned appropriately in the self contained unit which is in turn positioned appropriately in the vehicle or equipment of the operator under investigation.

Optionally, as an add on to the system 10 of the present invention a sensor 22 which is an inductive coil can be positioned adjacent to brake indicator wiring for sensing application and releasing of the brake pedal.

Other optional add ons to the system 10 are sensors 26 and 28 which are inductive coils provided adjacent to indicator wiring for sensing the intention to change direction of the vehicle.

Signal filtering means 30 are provided to filter sensing signals from the sensors 18 to 28 so that the signals available to the processing unit is free or substantially free of noise and signals not relevant to the measurement of the operation under evaluation.

In this embodiment the signal filter means 30 is in the form of an active/adjustable tuned filtering circuit provided adjacent to each of the sensors 18–28. The tuned circuit is subject to 10 time over sampling technique with moving average filtering algorithm.

The system 10 has a calibration means 32 for calibrating the sensing unit 12, the signal filtering means 30, the signal processing means 14 and the display system 16 which includes audible and visual indication of unacceptable operator performance.

The calibration means 32 of this embodiment is in the form of a plug-in calibration module which has been precalibrated for the area expected of the vehicle equipped within the monitoring time interval. The module is calibrated taking into account the terrain, local traffic regulation and condition, fleet operator requirements and expected weather conditions.

A data input means 34 is provided for entering information relating to the type of vehicle, driver identity sensor type and location.

The data for sensor type and location can only be changed by a supervisor provided with an authorised password which must be entered before editing for this data is allowed.

The signal processing unit 14 has signal recording means 36 and a signal analysing means 38. In this example the recording means 36 is a multi channel data acquisition system incorporating non volatile memory which can be downloaded into a computer.

The signal analysing means 38 in this case is customised MICROSOFT EXCEL™ spreadsheet program which processes the captured signals and provides performance indications of the driver on operation against prescribed standards and history.

Power supply system 40 in this case provides an intelligent energy management of power supply from batteries or other power source. Passive movement detectors such as mercury switches and a multi staged timing circuitry can be used to reduce power consumption during prolonged periods of inactivity by detecting movement and providing controlled power for a fixed time following the movement detection.

Figure 1A:
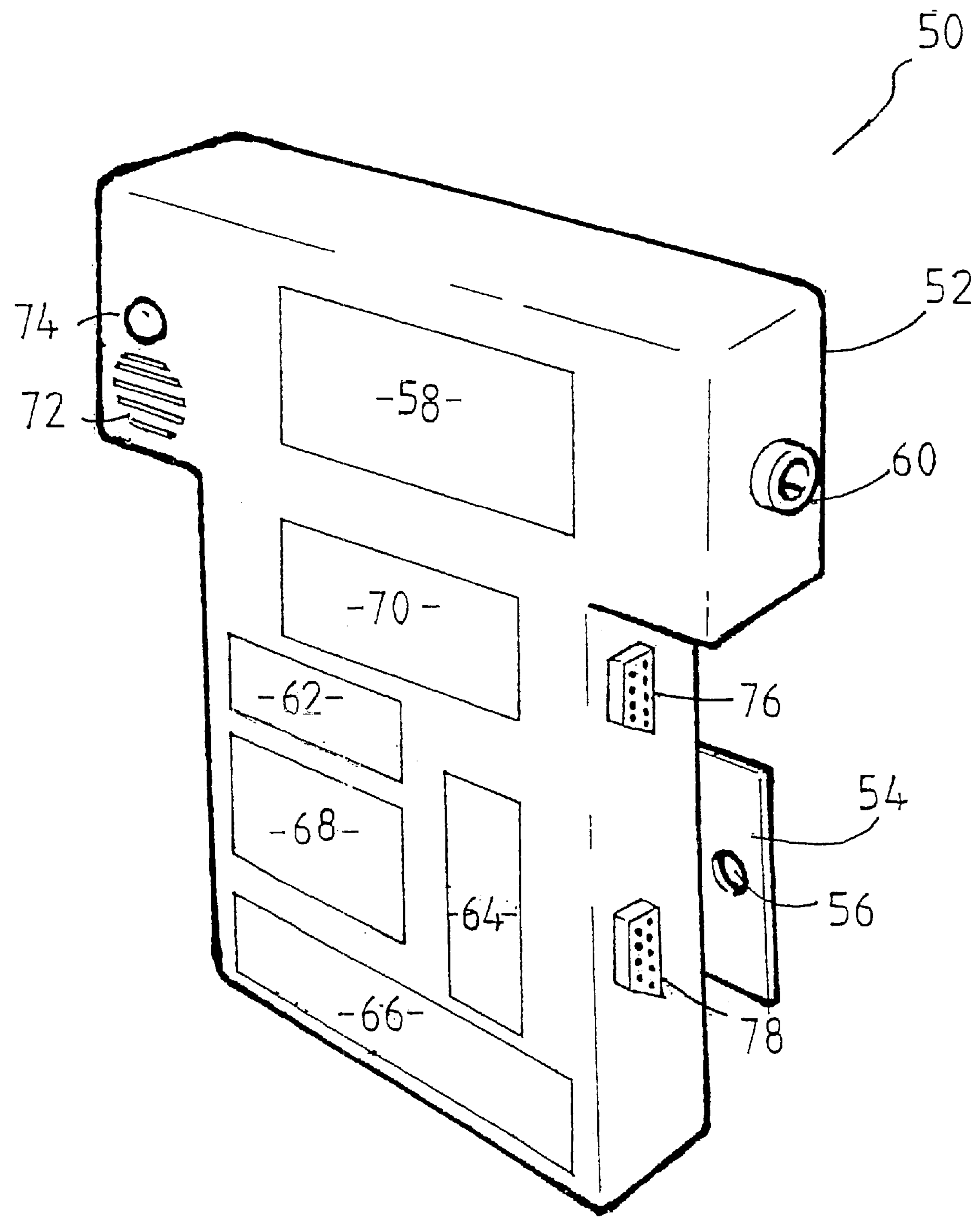
FIG. 1A is a schematic diagram showing another embodiment of the system according to the present invention.

FIG. 1A shows a self-contained system 50 for monitoring and/or evaluating driver performances when driving a vehicle. The system 50 has a housing 52 which accommodates all other components of the system 50. The housing 52 includes a fixing plate 54 by which the system 50 can be removably fixed to any convenient position of the vehicle. In this embodiment the plate 54 has an aperture 56 through which fixing means (not shown) such as a screw can be employed to removably fixing the system 50 to a part of the vehicle.

As shown schematically in FIG. 1A the systems 50 includes a battery pack 58 which supplies power to all components of the system 50 The system 50 has a connector 60 for connection to an external power source (not shown) for supplying power or for charging the battery pack 58. Power supply is controllably managed by a power management unit 62 which puts the system 50 in a standby mode when movement is detected for a predetermined time period.

A six degree of freedom sensor unit 64 is incorporated for detecting cornering and acceleration/braking of the vehicle. In this embodiment the unit 64 is a dual axial moving coil accelerometer. Measurements of the sensor unit 64 which correspond to unacceptable cornering operations and acceleration/braking operations are calibrated by a calibration unit 66 which can be adjusted by an operator to suit expected acceptable driver performance. The calibration unit 66 may have individual adjustable potentiometers for adjusting the acceptable driving operations. Alternatively the adjustments can be provided by a suitable software program.

An event decision unit 68 is provided to control recording of unacceptable operations. All recordings are saved in a data acquisition unit 70, The system 50 has an audio indicator 72 and a visual indicator 74. The indicators 72 which may be an LED and 74 which may be a buzzer are adapted to provide signals to the driver or operator that the driving performance is unacceptable.

The system 50 is provided with an interface 76 for interfacing with optional external sensors and vehicle computers. It is also provided with an interface 78 for interfacing with an external computer and a calibration setting unit.

An example of the calibration unit 66 is a PCMCIA data acquisition card installed in a computer. The card is connected via the interface 78 directly to the sensor unit 64 which is a dual axial moving coil accelerometer available commercially. A handheld switch (not shown) can also be connected to the PCMCIA card.

In one case the system 50 was calibrated for use in a Subaru Liberty station wagon which was driven both in a normal manner and in a manner exceeding acceptable acceleration, braking and cornering limits. The undesired events were identified by the event decision unit 68 and the accelerometer sensor data for each axis (left and right cornering, acceleration/braking) as well as the timing of operation of the hand held switch by the person responsible for calibration were recorded in the data acquisition unit 70. The recorded data were later downloaded for storage in a storage of a computer for analysis with a Microsoft Excel spreadsheet program.

Figure 6:
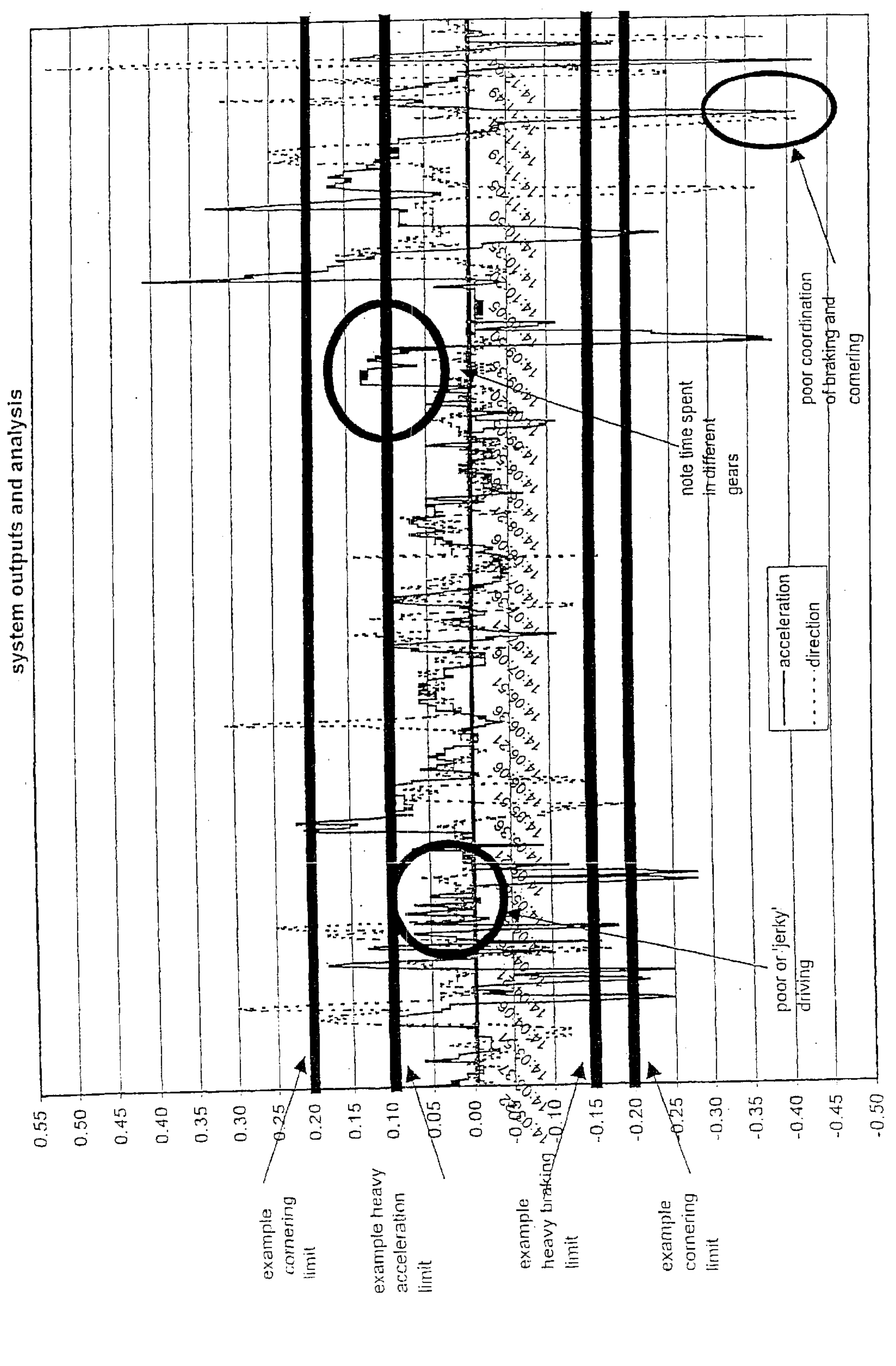

The recorded sensor and switch values, and timings corresponded to acceleration thresholds that indicate onset of an unacceptable event. The graph in FIG. 6 shows the thresholds obtained using the abovementioned calibration.

The recorded acceleration values were used to set the potentiometers in the system 50 for adjusting the switch-on points of switches such as transistors. This ensures that the system 50 will only record events outside acceptable operation parameters.

Figure 2:
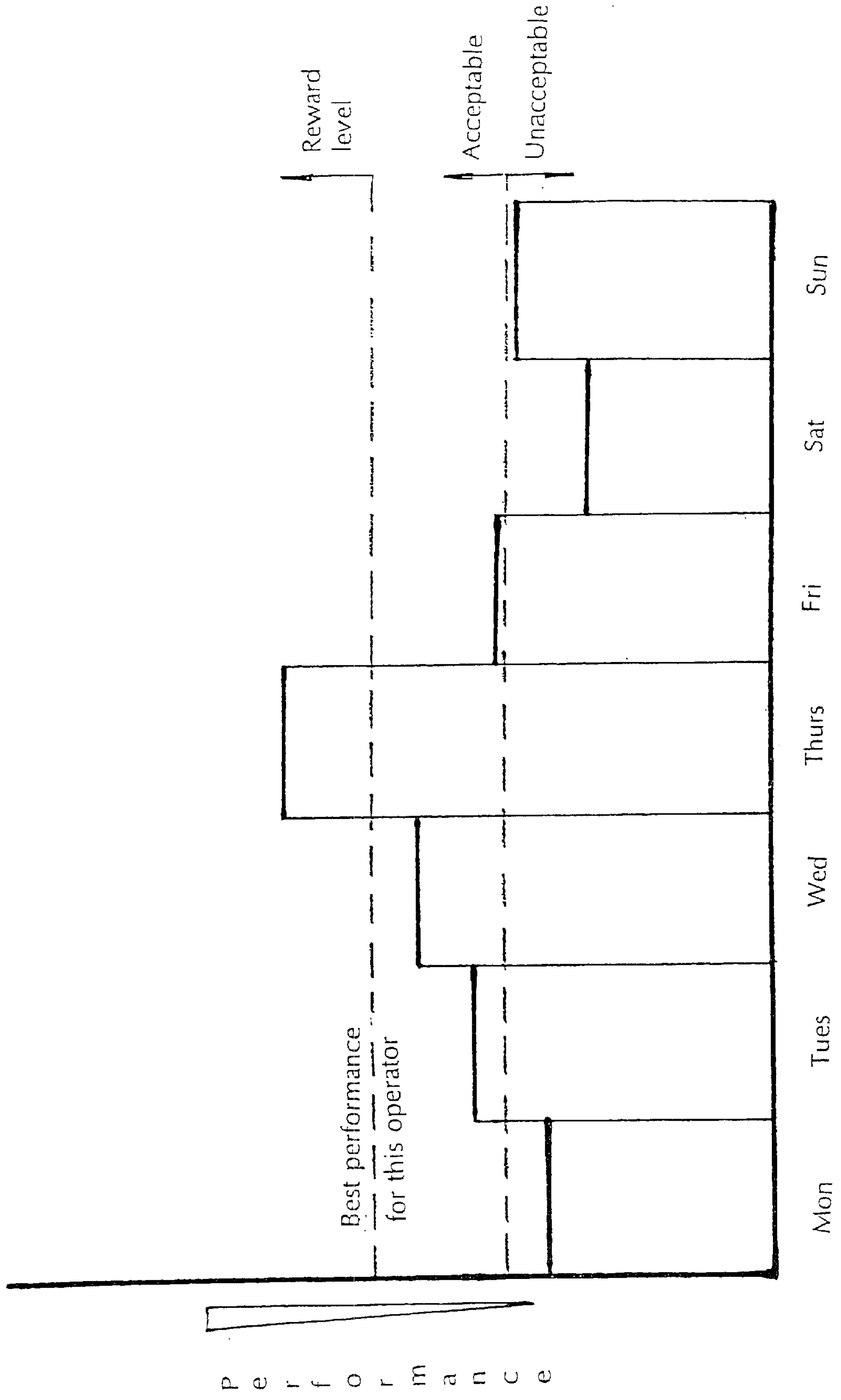

The performance indication shown in FIG. 2 is a bar chart showing average performance levels throughout the week on a daily basis.

Figure 3:
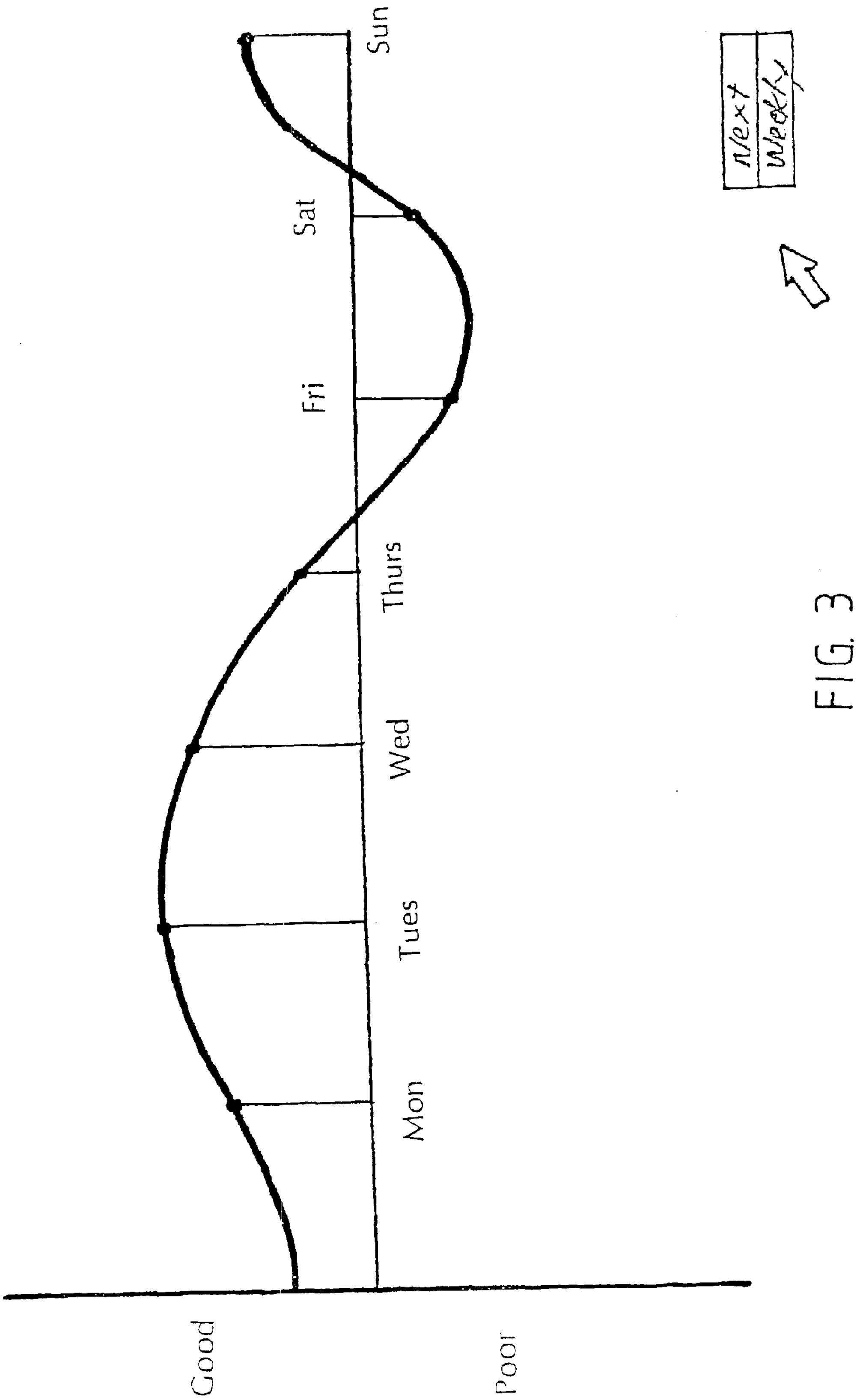

FIG. 3 also shows average performance levels throughout the week on a daily basis. But in this case the performance levels are extrapolated in a curve form. It also indicates good and poor performance levels.

Figure 4:
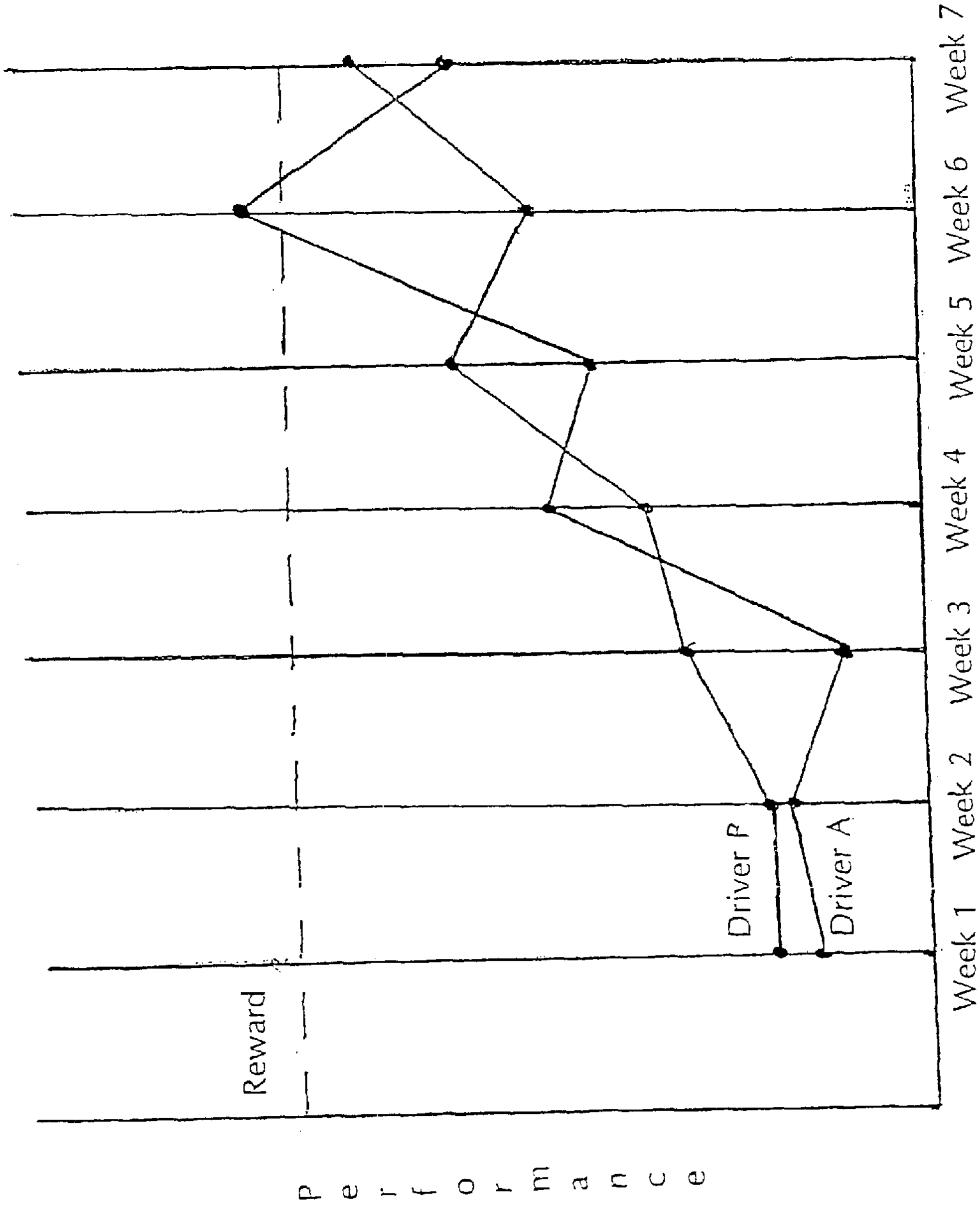

FIG. 4 shows weekly performance indications for two drivers over 7 weeks. This allows a direct measurement of performance of different drivers.

Figure 5:
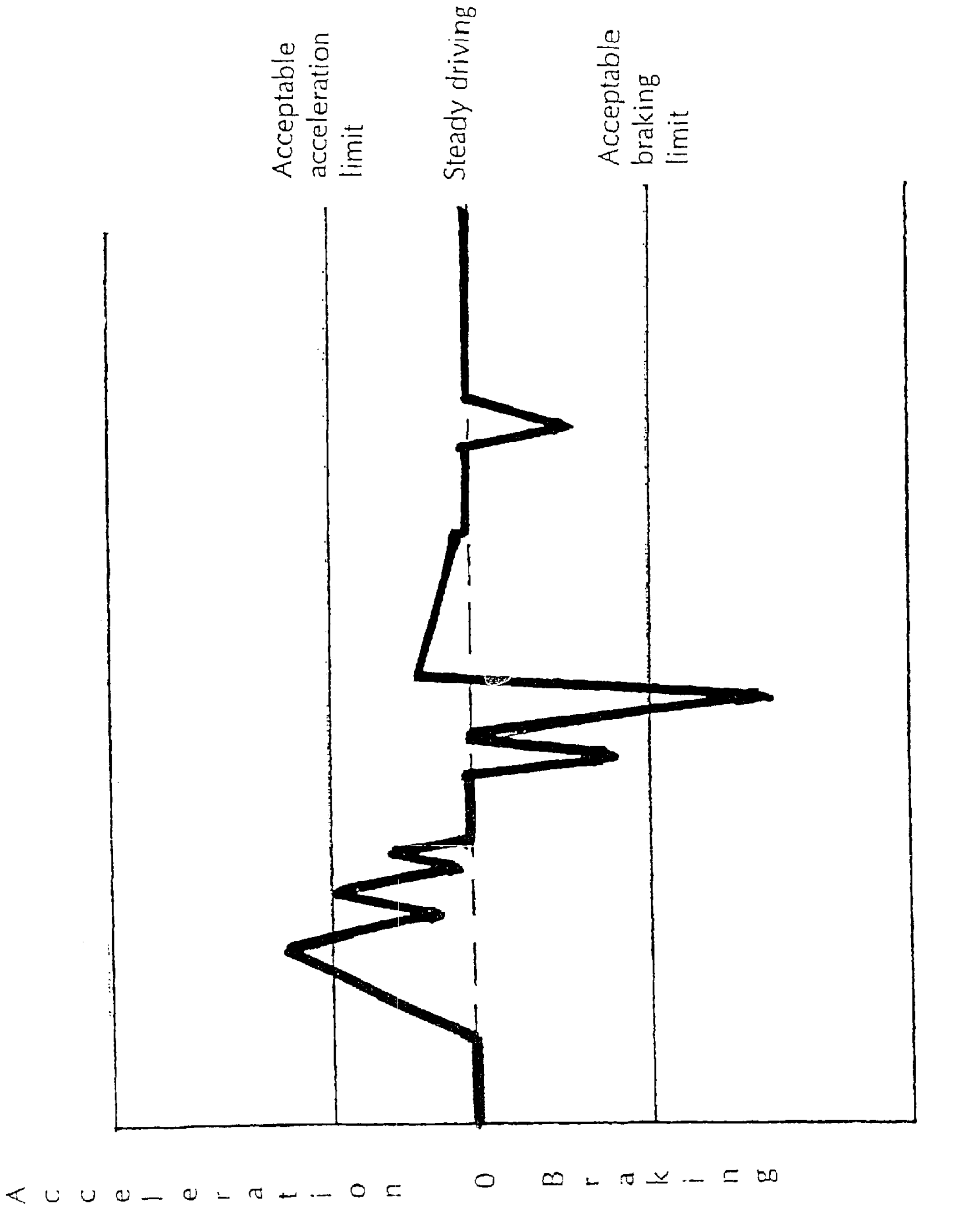

FIG. 5 shows a performance indication based on acceleration and deceleration only. FIG. 6 shows a composite performance indication for aspects of driver behaviours in relation to acceleration and deceleration; direction of travel, cornering and brake application. As can be seen the recorded times are periodic and are time stamped. This indication clearly reveals driver behaviours in the above aspects of driving. FIG. 6A shows examples of some of the data provided to the signal analysing means 38 for obtaining the performance indication shown in FIG. 6. Calibration data are also shown in FIG. 6A.

Figure 7:
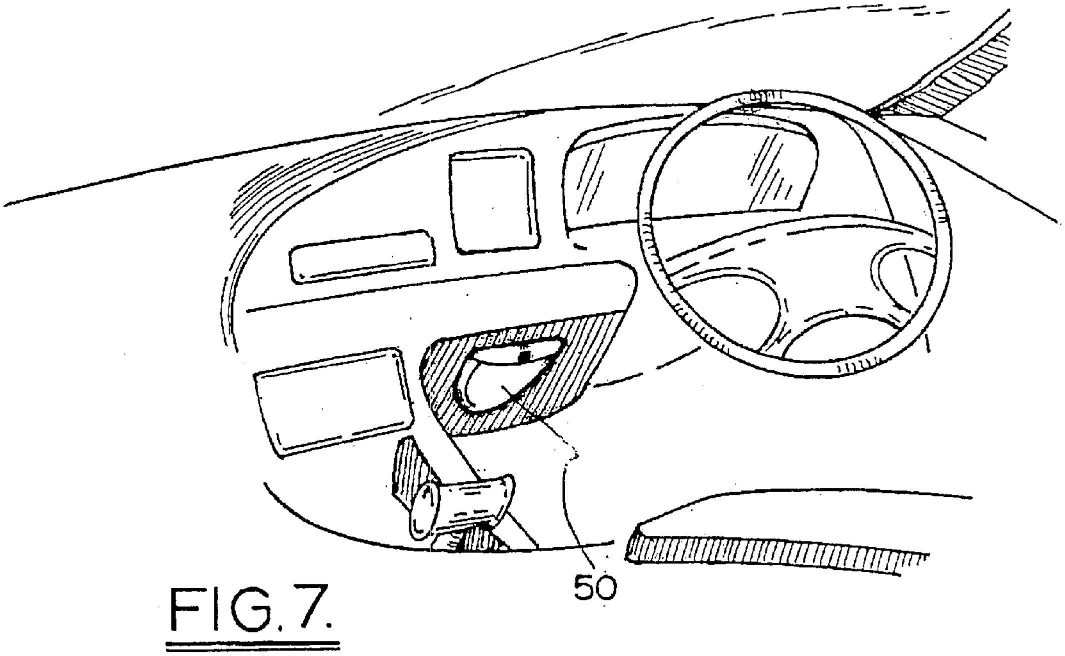
FIG. 7 shows an in boot version of the system according to the present invention.

FIG. 7 shows a version of the system 10/50 of the present invention that can be placed on or under the dashboard of the vehicle. The system 10/50 as shown has red and green lights, and an audible indicator for indicating good and poor performance respectively. It also has press buttons to enter other information as for means 34.

Figure 8:
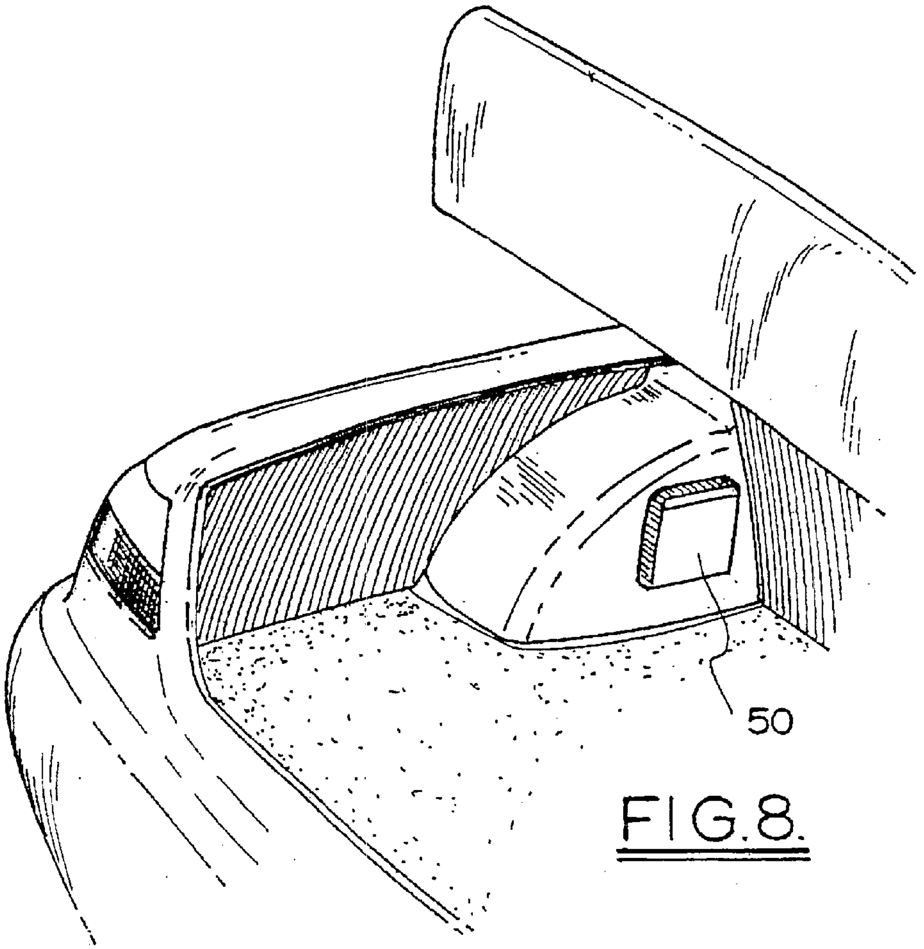
FIG. 8 shows an under dash version of the system according to the present invention.

FIG. 8 shows another version of the system 10/50 which can be placed in the boot of the vehicle as it does not indicate driver performance directly. The acquired signals are recorded on a removable media or removable disk. The recorded signals are to be processed for operator performance indications at a later stage.

Whilst the above has been given by way of illustrative example of the present invention many variations and modifications thereto will be apparent to those skilled in the art without departing from the broad ambit and scope of the invention as herein set out in the appended claims.

What is claimed is:

1. A system for monitoring and/or evaluating performance of an operator of a controllably movable object having operational parameters and at least one of the operational parameters is changeable when varying an aspect of operating behaviours of the operator, the system comprising:

a housing member with a chamber therein;

a sensing unit positioned on said housing member or in said chamber, the sensing unit having one or more sensors, each sensor being arranged to sense at least one of said operational parameters;

a processing unit arranged to receive signals representative of the operational parameters from said one or more sensors, to process the received signals and to provide output signals corresponding to the performance relating to one or more aspects of the operating behaviours of said operator;

a calibration unit for selectively calibrating the system for use with different types of controllably movable objects; and an indication unit arranged to receive the output signals and to thereby provide an indication of the operator performance, the calibrating unit including means for calibrating any one or a combination of two or more of the following:

terrain;

local traffic regulation;

traffic condition;

application;

expected weather condition; and expected operator performance.

2. A system for monitoring and/or evaluating performance of an operator of a controllably movable object having operational parameters and at least one of the operational parameters is changeable when varying an aspect of operating behaviours of the operator, the system comprising:

a sensing unit having one or more sensors, each sensor being arranged to sense at least one of said operational parameters including a parameter for turning of said object to a different direction;

a processing unit arranged to receive signals representative of the operational parameters from said one or more sensors, to process the received signals and to provide output signals corresponding to the performance relating to one or more aspects of the operating behaviours of said operator;

said one aspect or at least one of said aspects being turning said object to a different direction;

a calibration unit for selectively calibrating the system for use with different types of controllably movable objects; and an indication unit arranged to receive the output signals and to thereby provide an indication of the operator performance, the calibrating unit including means for calibrating any one or a combination of two or more of the following:

terrain;

local traffic regulation;

traffic condition;

application;

expected weather condition; and expected operator performance.

3. The system according to claim 1 wherein said one or more sensors including a plurality of single axial accelerometers or gyroscopes, and each of the accelerometers or gyroscopes is adapted to sense the operational parameters relating to any one of the following:

acceleration/deceleration;

orientation in one of multiple axes;

application of a braking or retarding device;

cornering;

lane changing;

smoothness of operation;

gear changing;

warning lights;

road quality;

weather conditions;

speed; and position.

4. The system according to claim 1 wherein said one or more sensors including one or more multi axial accelerometers or gyroscopes, and each axis of the accelerometers or gyroscopes is adapted to sense one of the followings:

acceleration/deceleration;

orientation in one of multiple axes;

application of a braking or retarding device;

cornering;

lane changing;

smoothness of operation;

gear changing;

warning lights;

road quality;

weather conditions;

speed; and position.

5. The system according to claim 1 wherein said processor unit being connected to a data logging unit having memory means adapted to store the received signals and/or the output signals, and the processor unit being adapted to selectively retrieve said output signals for display on the indication unit and/or selectively transfer the received signals and/or the output signals to an external terminal device.

6. The system according to claim 1 wherein said processor unit being connectable to a communications device for communicating with a remote communications device.

7. The system according to claim 6 wherein said remote communications device is a base station which is arranged to communicate between the processor unit and the communications device the received signals and/or the output signals stored in the memory means, and/or to transmit program codes to said processor unit, and/or to transmit information for displaying on the indication unit and/or to store in said memory means.

8. The system according to claim 6 wherein said remote communications device is a geo position satellite for communicating position data between the processor unit and said satellite.

9. A system for monitoring and/or evaluating performance of an operator of a controllably movable object having operational parameters and at least one of the operational parameters is changeable when varying an aspect of operating behaviours of the operator, the system comprising:

a housing member with a chamber therein;

a sensing unit positioned on said housing member or in said chamber, the sensing unit having one or more sensors, each sensor being arranged to sense at least one of said operational parameters;

a processing unit arranged to receive signals representative of the operational parameters from said one or more sensors, to process the received signals and to provide output signals corresponding to the performance relating to one or more aspects of the operating behaviours of said operator;

said processor unit being connectable to a geoposition satellite for communicating therewith and for transferring positional data therebetween; and an indication unit arranged to receive the output signals and to thereby provide an indication of the operator performance.

10. A system for monitoring and/or evaluating performance of an operator of a controllably movable object having operational parameters and at least one of the operational parameters is changeable when varying an aspect of operating behaviours of the operator, the system comprising:

a housing member with a chamber therein;

a sensing unit positioned on said housing member or in said chamber, the sensing unit having one or more sensors, each sensor being arranged to sense at least one of said operational parameters;

a processing unit arranged to receive signals representative of the operational parameters from said one or more sensors, to process the received signals and to provide output signals corresponding to the performance relating to one or more aspects of the operating behaviours of said operator;

a calibration unit for selectively calibrating the system for use with different types of controllably movable objects;

an interface for connecting said calibration unit to an external calibration device adapted for calibrating the calibration unit; and an indication unit arranged to receive the output signals and to thereby provide an indication of the operator performance.

11. The system according to claim 1 wherein said system includes an interface for connecting said calibration unit to an external calibration device adapted for calibrating the calibration unit.

12. The system according to claim 1 wherein said system includes a battery pack for powering said system and/or a power connector for connection to an external power source for charging and/or powering said system.

13. The system according to claim 1 wherein said system includes fixing means for removably fixing to said controllably movable object.

14. The system according to claim 13 wherein said controllably movable object is a vehicle, a crane, a conveyor, a shaping tool, or a cutting tool.

15. The system according to claim 14 wherein said system is fixed to a part of the vehicle which is visible while driving.

16. The system according to claim 1 wherein the processor unit is adapted to indicate said output signals in a form that allows evaluation of the operator's performance.

17. The system according to claim 16 wherein said system includes a real time clock and the processor unit is adapted to access the time when receiving each signal so that each received signal is time stamped.

18. The system according to claim 16 wherein the form of the indication includes aspects of the operating behaviours that require attention.

19. The system according to claim 1 wherein the system further includes a power management arrangement having a timing circuitry for providing a first predetermined time period following detection of the output signal by said one or more sensors, and a power control circuitry for reducing power consumption when the output signal is not detected following expiration of said first predetermined time period.

20. The arrangement according to claim 19 further comprising linked microprocessors or digital signal processors providing a low power standby mode.

21. A system for monitoring and/or evaluating performance of an operator of a controllably movable object having operational parameters and at least one of the operational parameters is changeable when varying an aspect of operating behaviours of the operator, the system comprising:

a housing member with a chamber therein;

a sensing unit positioned on said housing member or in said chamber, the sensing unit having one or more sensors, each sensor being arranged to sense at least one of said operational parameters;

a processing unit arranged to receive signals representative of the operational parameters from said one or more sensors, to process the received signals and to provide output signals corresponding to the performance relating to one or more aspects of the operating behaviours of said operator;

the processor unit being adapted to indicate said output signals in a form that allows evaluation of the operator's performance;

a real time clock to which the processor unit is adapted to access for retrieving the time when receiving each signal so that each received signal is time stamped; and an indication unit arranged to receive the output signals in said form and to thereby provide an indication of the operator performance.

* * * * *